United States Patent [19]

Dragone et al.

[11] Patent Number: 5,208,885
[45] Date of Patent: May 4, 1993

[54] OPTICAL FIBER TO STRIP WAVEGUIDE INTERCONNECT

[75] Inventors: Corrado Dragone, Little Silver; Herman M. Presby, Highland Park, both of N.J.

[73] Assignee: AT&T Bell Laboratories, Murray Hill, N.J.

[21] Appl. No.: 842,919

[22] Filed: Feb. 27, 1992

[51] Int. Cl.[5] ............................................. G02B 6/26
[52] U.S. Cl. ...................................... 385/49; 385/46; 385/47
[58] Field of Search .............................. 385/49, 46, 47

[56] References Cited

U.S. PATENT DOCUMENTS

| | | | |
|---|---|---|---|
| 4,360,248 | 11/1982 | Bickel et al. | 385/46 |
| 4,484,794 | 11/1984 | Witte | 385/49 X |
| 4,767,174 | 8/1988 | Carenco et al. | 385/49 X |
| 4,904,042 | 2/1990 | Dragone | 385/46 |

OTHER PUBLICATIONS

"Fiber Attachment for guided Wave Devices," E. J. Murphy, J. Lightwave Technology, vol. 6, No. 6, Jun. 1988.
"Efficient Multichannel Integrated Optics Star Coupler on Silicon" C. Dragone, et al., IEEE Photonics Tech. Lett., vol. 1, No. 8, Aug. 1989.
"Integrated Four-Channel Mach-Zehnder Multi/-Demultiplexer Fabricated with Phosphorous Doped $SiO_2$ Waveguides on Si".
B. H. Verbeek, et al., J. of Lightwave Tech., vol. 6, No. 6, Jun. 1988.

Primary Examiner—John D. Lee
Assistant Examiner—Phan Thi Heartney
Attorney, Agent, or Firm—E. Weiss

[57] ABSTRACT

This invention is directed toward joining, with glass, a waveguide supported by a substrate to an optical fiber. In a preferred embodiment, a glass material which melts at a temperature that is lower than the temperature to which the waveguide can be safely heated is applied to either the optical fiber and/or the waveguide. The glass material is then heated to cause it to connect the optical fiber to the waveguide. A feature of the invention is the presence of heat breaks in the substrate upon which the waveguide resides to thermally isolate the end of each waveguide and the underlying substrate from adjacent waveguides and the portions of the substrate which underlie said adjacent waveguides. The heat breaks restrict heat from being conducted along the end of the substrate from one waveguide region to adjacent waveguide regions when heat is being applied to make a connection.

14 Claims, 4 Drawing Sheets

OPTICAL FIBER TO STRIP WAVEGUIDE INTERCONNECT

TECHNICAL FIELD

This invention relates to an optical interconnect and more particularly to a technique for attaching an optical fiber to a strip waveguide of a doped silica film formed on a silicon substrate.

BACKGROUND OF THE INVENTION

A means of fabricating integrated optical components is by the deposition of doped silica waveguides formed on a doped silica film deposited on a silicon substrate. This technology, referred to "silica on silicon," has the potential to make optical devices that are smaller in size, are of greater complexity, and are potentially lower in cost than discrete optical devices which are fabricated from fiber and micro-optic components.

A variety of passive optical components have been made using silica on silicon technology in which optical waveguides are formed using a phosphosilicate glass (P-doped silica) core. In one fabrication method, the waveguides are deposited on a base layer called "hipox" formed by the oxidation of silicon under high pressure steam. The core is then covered with a thin cladding layer of $SiO_2$. Device built using this technology include compound Bragg reflectors, multiplexers, adiabiotic polarization splitters, and array star couplers.

At the present time, phosphosilicate glass core waveguides of integrated optical devices made using silica on silicon technology are normally butt coupled to input-output optical fibers by means of a bonding material such as an epoxy, UV-adhesive and/or, in some instances, a potting material. The substance used to join the waveguides of the optical device to an optical fiber also serves the necessary step of filling in gaps which may exist at the butt coupling. However, in those applications where the failure of the bonding material or deterioration of its optical properties can result in extremely expensive repairs, such as in undersea cable applications, the use of these materials is not acceptable.

The publication entitled "Fiber Attachment for Guided Wave Devices", by E. J. Murphy, Journal of Lightwave Technology, Vol. 6, No. 6, June 1988, presents a review of the status of fiber attachment to guided-wave devices. Current methods for achieving low fiber-to-waveguide-to-fiber insertion losses are discussed and techniques for aligning and permanently attaching fibers are described.

In this publication the author asserts that an appropriate bonding material and method of application is critical as it determines the stability and reliability of the fiber-waveguide joint. He notes that UV curing adhesives are widely used because they can be cured rapidly without compromising the fiber alignment. However, UV-adhesives have questionable stability when subjected to environmental extremes in temperature, pressure or humidity and therefore, the joints may not be sufficiently stable. Equally important, even a slight deterioration in the optical properties of the epoxy will seriously impair the transmission of optical signals through it.

The publication concludes with the statement that a major challenge of the next decade will be to develop a reliable and robust fiber attachment and packaging technology.

The invention here disclosed is specifically directed toward solving this problem by providing a reliable and robust fiber-waveguide butt coupling arrangement which can be used in all environment and applications, including undersea applications.

SUMMARY OF THE INVENTION

This invention is directed toward joining, with glass, a waveguide supported by a substrate to an optical fiber. In a preferred embodiment, a glass material which melts at a temperature that is lower than the temperature to which the waveguide can be safely heated is applied to either the optical fiber and/or the waveguide. The glass material is then heated to cause it to connect the optical fiber to the waveguide. A feature of the invention is the presence of heat breaks in the substrate upon which the waveguide resides to thermally isolate the end of each waveguide and the underlying substrate from adjacent waveguides and the portions of the substrate which underlie said adjacent waveguides. The heat breaks restrict heat from being conducted along the end of the substrate from one waveguide region to adjacent waveguide regions when heat is being applied to make a connection.

DETAILED DESCRIPTION

Figure 1:
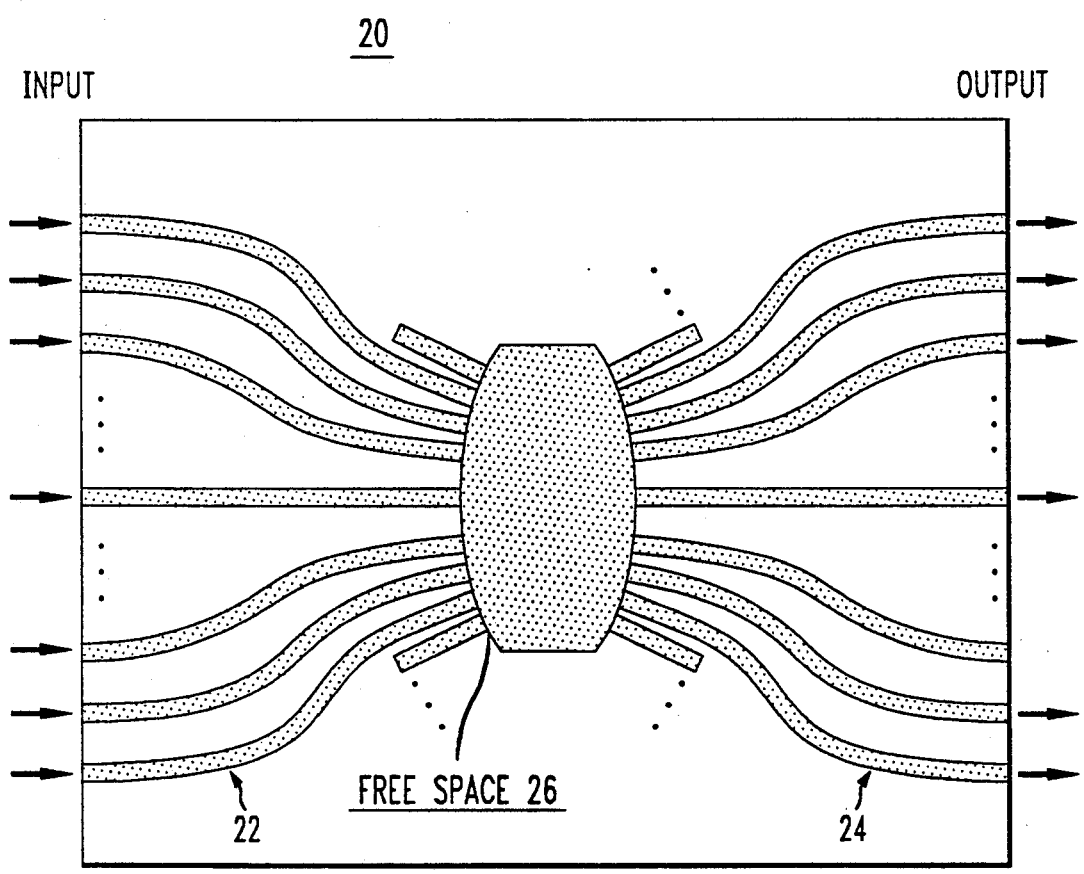
FIG. 1 is a schematic representation of a multichannel integrated star coupler made using silica on silicon technology.

Referring to FIG. 1, there is illustrated a multichannel integrated optics star coupler 20 consisting of two arrays 22, 24 of waveguides separated by a slab 26 fabricated on a silicon substrate using silica/silicon ($SiO_2/Si$) technology as described in IEEE Photonics Technology Letters, Vol. 1, No. 8, August 1984, pages 241–243 by C. Dragone et al. The coupler is composed of a symmetric arrangement of two arrays of waveguides, separated by a region of planar free space which occupies the center of the coupler. In operation an input signal is distributed equally among all the output waveguides.

The coupler is made from P-doped silicon films formed as a silicon substrate as discussed in J. Lightwave Technol., Vol. 6, pages 1011–1015, 1988, "Integrated Four-Channel Multi/Demultiplexer Fabricated With Phosphorous doped $SiO_2$ Waveguides on Si" by B. H. Verbeek et al.; and J. Lightwave Technol., Vol. 7, pages 308–313, 1989.

In use, input and output optical fibers are coupled to the ends of waveguides of the star coupler. The attachment of optical fibers to the ends of the waveguides on a substrate is probably the most difficult challenge encountered in packaging optical devices. The fibers and devices, after they are aligned, must be coupled to each other with tolerances that are at least ten times more demanding than tolerances required for integrated circuit packaging. Normally, as the optical fibers are each attached individually, it is important that the optically polished end face of neighboring waveguides not be contaminated during the attachment process. If a liquid adhesive, e.g., epoxy, is used, it must be carefully applied and/or cured locally to prevent coating of the adjacent waveguide end faces with cured adhesive. Also, because of the very small dimensions of the waveguide and the optical fiber, the fiber is held in place over a very small surface area which results in a butt joint of minimum strength. In some instances, this problem can be remedied by potting the optical fibers to the substrate with strength members as a final step. A problem with this procedure is that stress-induced misalignments can occur. For those applications in which only one fiber is needed or the waveguides are widely spaced, capillary tubes or jewels with a centered hole can be used for increased surface area and stability.

Figures 2, 3:
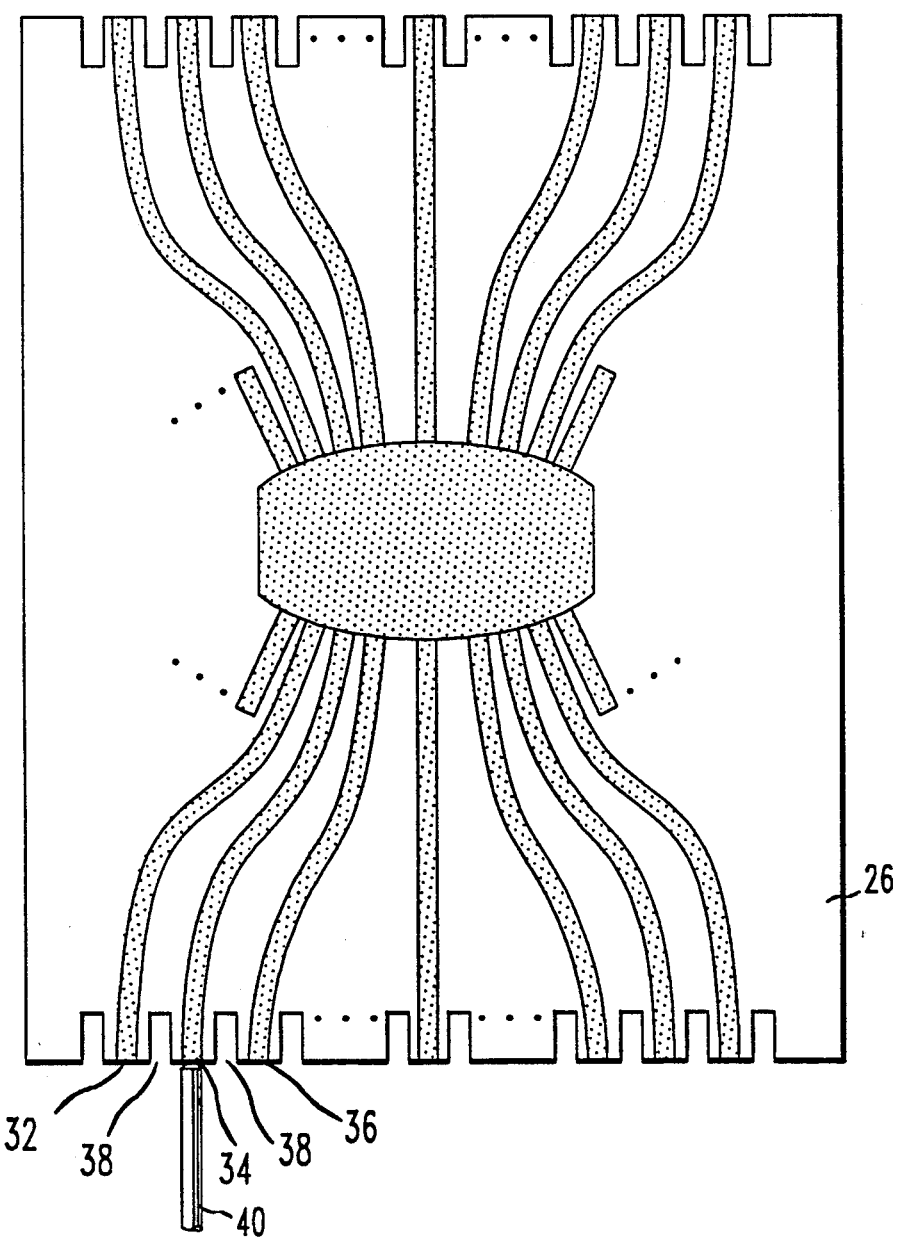
FIG. 2 is an end view of the device or FIG. 1.
FIG. 3 is a schematic representation of a star coupler made using silica on silicon technology having thermally isolated waveguide ends in accordance with the principles of the invention.

Referring to FIGS. 2 and 3, there is illustrated the multichannel integrated optic star coupler f FIG. 1 adapted to enable the waveguides on the silicon substrate to be connected to optical fibers in accordance with the principles of the invention. FIG. 2 is an expanded end view of the coupler and substrate; and, FIG. 3 is a top view of the coupler. The dimensions of an N×N star coupler such as illustrated in FIG. 1, where N is equal to 19 is about 1.5×3.0 cm with a thickness of about 0.55 mm. The spacing of the waveguides is about 250 μm.

The substrate on either side of the waveguides is removed to provide heat breaks which thermally isolate each waveguide from the adjacent waveguide regions.

Referring to FIGS. 2 and 3, the substrate 26 located between adjacent waveguides 32 and 34; and 34 and 36 is removed to provide a heat break 38 which extends from the edge of the substrate back along each side of the waveguide 34. The purpose of the heat break 38 is to thermally isolate the end of waveguide 34 and the underlying substrate from the ends of waveguides 32, 36 and the portion of the substrate upon which they reside.

Thus, the end of each waveguide and the substrate upon which it resides is thermally isolated from the ends of adjacent waveguides and the substrate upon which those ends reside.

An optical fiber 40 that is to be coupled to a waveguide end, for example, waveguide 34, is, in one embodiment, dipped into or coated with a glass paste consisting of, for example, Borosilicate-Aluminum-lead. The coated end of the optical fiber 40 is then aligned with and butted against the end of the waveguide 34 and the underlying substrate. Thus, the waveguide 34 and the optical fiber 40 are positioned end to end. The glass paste and the ends of the waveguide and the optical fiber are then heated with, for example, a laser to cause the carrier vehicle in the glass paste to evaporate and the glass particles to coalisce and connect the end of the optical fiber to the end of the waveguide and the underlying substrate.

The structure can be heated with a $CO_2$ laser or with an Excimer laser. It is noted that the optical fiber is substantially transparent to the energy from the Excimer laser at 240 nm while the Borosilicate glass, which is the glass paste, is substantially opaque. Thus, the glass paste and the substrate will heat up, the vehicle in the glass paste will evaporate, and the glass will connect the optical fiber to the waveguide and the underlying substrate. Neither the waveguide nor the optical fiber is affected adversely by the heat. Actually, the waveguide can be heated to about 1,000° C. before the dopant, P, in the waveguide starts to evaporate. In practice, with this invention, it was determined that consistently good bonds can be obtained by applying heat directly to the silicon substrate under the waveguide rather than directly to the glass paste or optical fiber. During the heating process, heat is applied to the end of the substrate underlying waveguide 34 by means of a laser. As the silicon substrate gets hot, the heat flows to the glass paste, the waveguide and the abutting end of the optical fiber. At some instant, the glass paste gets hot enough to cause the carrier vehicle to evaporate and the glass particles coalesce to form a glass bond. The thermal breaks 38 in the substrate help prevent the heat which is applied to the substrate from traveling along the edge of the substrate to adjacent waveguides or back into the relatively large mass of silicon substrate itself. Thus, the thermal breaks permit the substrate underlying the waveguide being joined to an optical fiber to be heated to a desired temperature quickly while the substrate which underlies adjacent waveguides remain relatively cool.

The glass paste can be applied to the end of the waveguide and/or the optical fiber after they are aligned, and further alignment adjustments can be made as the glass paste fuses and becomes transparent. If desired, the low temperature melting point glass paste can be applied before alignment takes place.

The thermal breaks 38 which thermally isolate the end of a waveguide from the ends of adjacent waveguides effectively blocks the heat which is applied to the end of the waveguide from flowing laterally along the substrate to the other waveguides. The result is that the heat which is applied to the end of the substrate which supports the waveguide that is being butt coupled to an optical fiber is channeled to heat the glass paste. The heat is blocked by the heat breaks from spreading out along the edge of the substrate.

Figure 4:
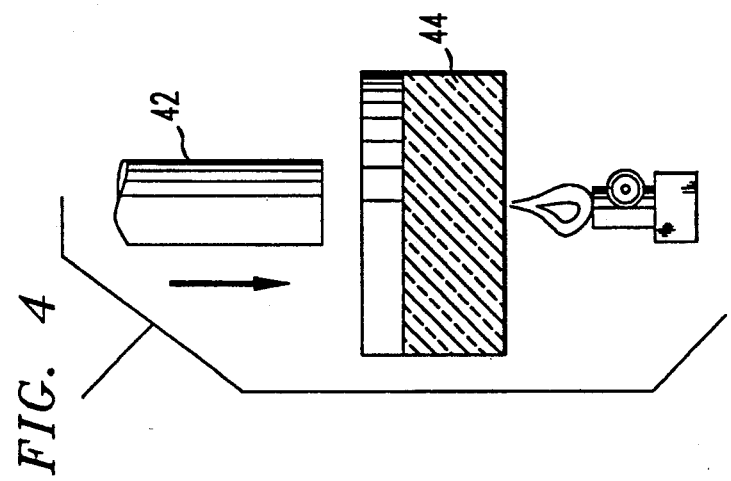
FIGS. 4, 5, and 6 illustrate the forming of a low melting glass hemisphere on the end of an optical fiber.
Figure 5:
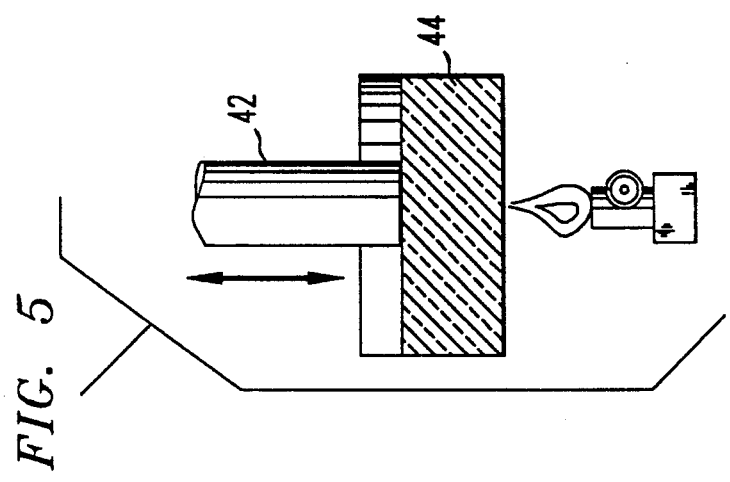
Figure 6:
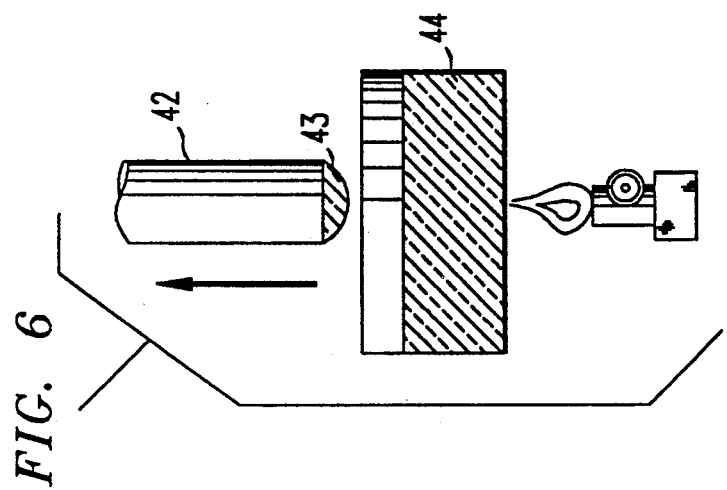
Figure 7:
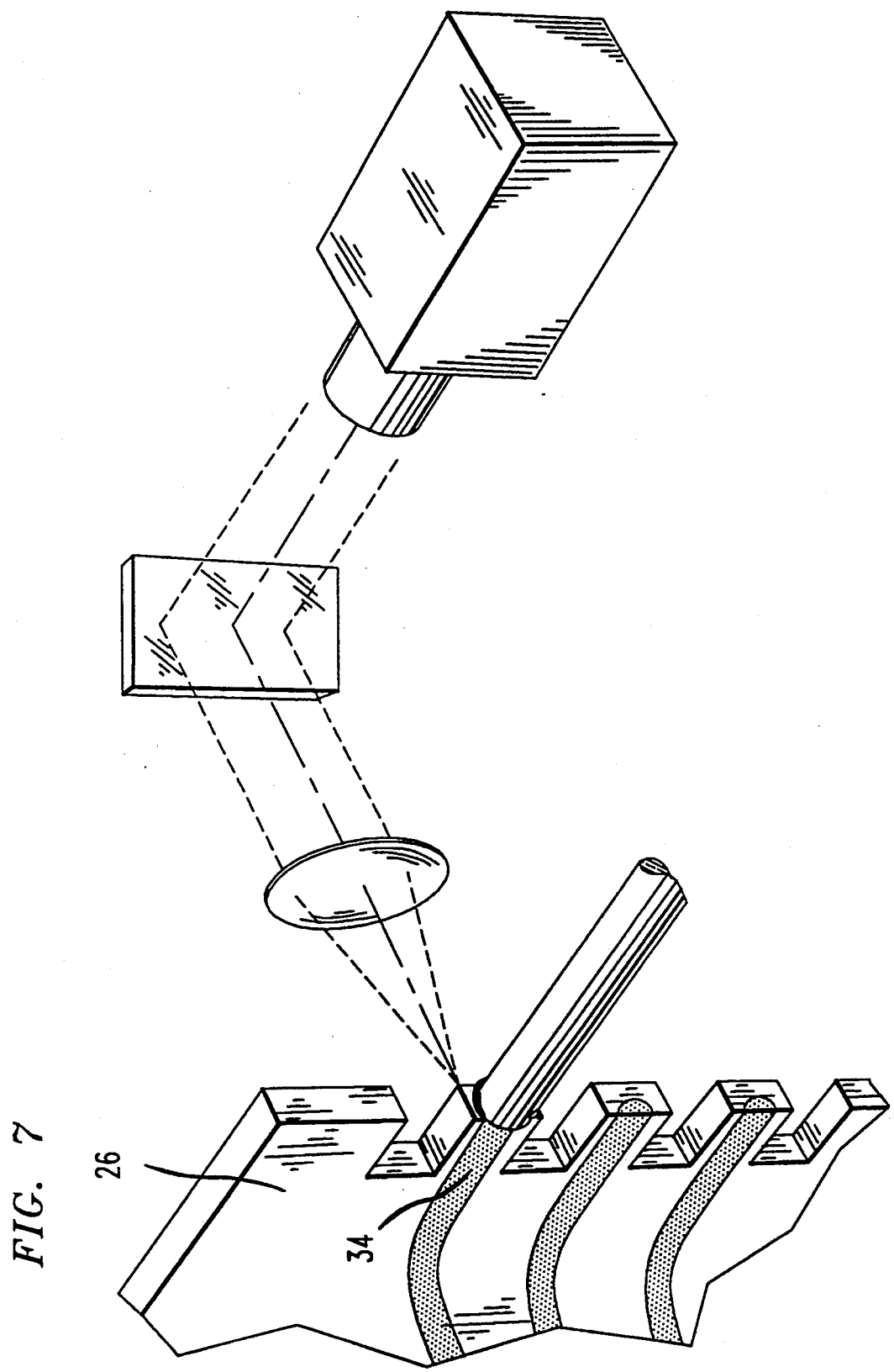
FIG. 7 illustrates forming a butt connection in accordance with the principles of the invention.

Referring to FIGS. 4, 5 and 6, there is illustrated a method and apparatus for applying a low melting temperature glass to the end of an optical fiber in accordance with the principles of the invention. A cleaved optical fiber 42 is moved down until it just touches the surface of a low temperature melting point glass such as, for example, Borosilicate glass 44 which is in its liquid state in a container. Upon removal of the optical fiber, a hemispherical end 43 is formed on tip of the fiber. Referring to FIG. 7, the optical fiber 42 is then aligned with and butted against the waveguide 34 on the substrate 26, and the substrate is heated until the glass on the end of the optical fiber melts to bond the end of the optical fiber to the end of the waveguide. Heating of the substrate can be with a $CO_2$ laser or, with an Excimer laser at 240 nm. As noted above, the optical fiber is substantially transparent to energy from an Excimer laser at 240 nm whereas the Borosilicate glass is opaque.

What has been described is merely illustrative of the application of the principles of the present invention. Other arrangements and methods can be implemented by those skilled in the art without departing from the spirit and scope of the present invention.

We claim:

1. A method of connecting a waveguide supported by a substrate to an optical fiber comprising the steps of
   aligning in butt relationship an end of the optical fiber with an end of the waveguide.
   applying a glass material to at least one of the two ends in butt relationship, said glass material having a melting temperature that is lower than the temperature to which the waveguide can be safely heated, heating the glass material to cause the glass material to connect the waveguide and the substrate to the optical fiber.

2. The method of claim 1 wherein the thermal expansion of said glass material is greater than the thermal expansion of said optical fiber and less than the thermal expansion of said substrate.

3. The method of claim 2 further comprising the step of forming a heat break in the substrate on either side of the waveguide.

4. The method of claim 3 further comprising the step of directing a laser beam at the substrate to heat the end of the substrate directly and the glass material by conduction.

5. The method of claim 1 wherein the glass material melts at a temperature less than 1,000° C.

6. The method of claim 5 wherein the glass material is a borosilicate glass.

7. The method of claim 5 wherein the glass material is a glass paste.

8. The method of claim 5 wherein the end of the optical fiber is coated with the glass material prior to being aligned with the end of the waveguide.

9. The method of claim 5 wherein the end of the waveguide is coated with the glass material prior to being aligned with the end of the optical fiber.

10. The method of claim 5 further comprising the step of using a laser beam to heat the glass material to its melting point.

11. The method of claim 5 further comprising the step of forming a heat break in the substrate on either side of the waveguide.

12. The method of claim 11 further comprising the step of directing a laser beam at the substrate to heat the end of the substrate directly and the glass material by conduction.

13. The method of claim 1 wherein said substrate has heat breaks which extend from an edge of the substrate back along either side of the waveguide.

14. An interconnect comprising a waveguide supported by a substrate, an optical fiber positioned end-to-end in butt relationship with said waveguide, heat breaks located within said substrate and which extend from an edge of the substrate back along each side of the waveguide, and glass material having a melting temperature that is lower than the temperature to which the waveguide can be safely heated coupled to join the end of the optical fiber to the end of the waveguide.

* * * * *